June 14, 1955  E. R. SCHAUPP  2,710,737
VALVE UNIT
Filed March 11, 1953  4 Sheets-Sheet 1

INVENTOR
E. R. Schaupp
ATTORNEYS

June 14, 1955

E. R. SCHAUPP 2,710,737

VALVE UNIT

Filed March 11, 1953

INVENTOR

E. R. Schaupp

BY

ATTORNEYS

June 14, 1955

E. R. SCHAUPP 2,710,737

VALVE UNIT

Filed March 11, 1953

INVENTOR
E. R. Schaupp
BY
ATTORNEYS

United States Patent Office 2,710,737
Patented June 14, 1955

2,710,737

VALVE UNIT

Edward R. Schaupp, Stockton, Calif.

Application March 11, 1953, Serial No. 341,733

3 Claims. (Cl. 251—218)

This invention relates to a valve, and particularly to one of the butterfly type, primarily designed for low pressure service such as ventilation control.

Ordinarily, a valve of this type does not provide a closed seal in the pressure line in which the valve is interposed because of the manner in which the valve disc is mounted in the valve body.

A major object of this invention, therefore, is to provide an annular valve-disc seating flange in the body on which the disc flatly seats when fully closed so that a positive seal against pressure leak is provided.

In connection with this feature, another object of the invention is to mount the valve disc so that it may clear the seat flange before any rotation is imparted to the disc to dispose the same in an open position, and to provide a mechanism for thus moving the disc through a predetermined fixed path.

A further object is to arrange said mechanism so that the operator has positive control of the valve disc at all times; said disc not being unbalanced by pressure flow within the body and no flutter of the valve due to pressure velocity can occur.

Other objects are to provide a valve and operating mechanism therefor which has no springs or loose fitting parts, which will operate with or against the flow, which offers a minimum of passage-obstruction, which is adaptable for a ground-joint, rubber or similar seal, and which embodies a simple and inexpensive structure with little or no machine work being involved.

Still another object of the invention is to provide a valve which is practical, reliable, and durable, and one which is exceedingly effective for the purpose for which it is designed.

These objects are accomplished by means of such structure and relative arrangement of parts as will fully appear by a perusal of the following specification and claims.

Figure 1:
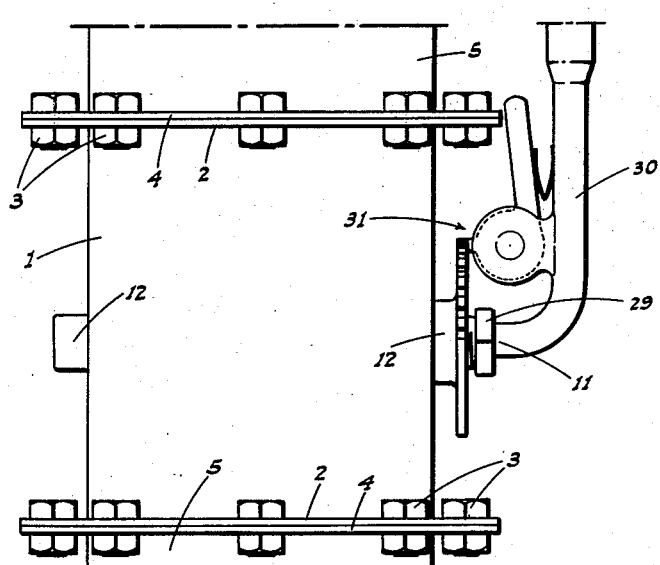
Fig. 1 is a side elevation of the valve as interposed in a pressure conduit.
Figure 2:
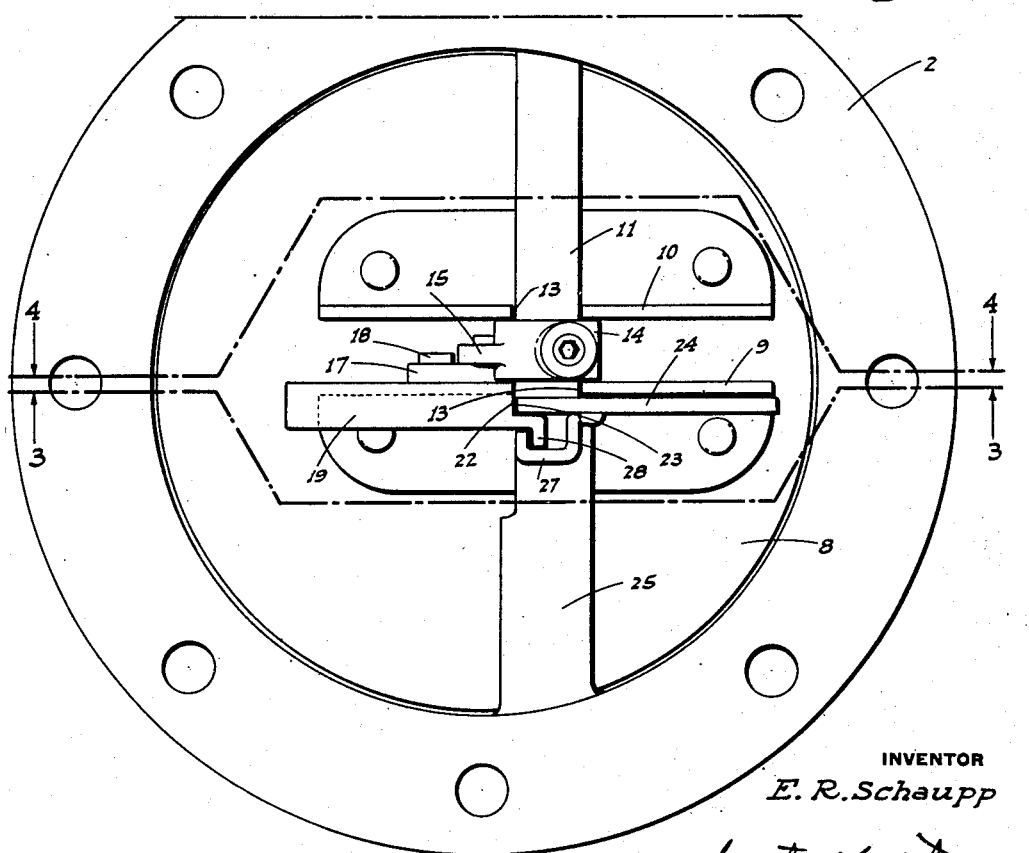
Fig. 2 is a plan view of the valve in a closed position.

Referring now more particularly to the characters of reference on the drawings, the valve comprises a tubular body 1 provided at its ends with flanges 2 whereby the body may be secured by bolts 3 to the matching flanges 4 of the conduit sections 5 between which the valve is interposed.

Near one end, the body is formed with an annular groove 6 facing the other end of the body and which supports a sealing ring 7 forming a seat for the valve disc 8.

Secured on and projecting from the face of the valve opposite the ring 7 is a pair of plates 9 and 10 spaced apart axially of a transverse operating shaft 11. This shaft is journaled in bosses 12 on the body at the sides thereof and is disposed somewhat to one side of the center of the body.

Figure 3:
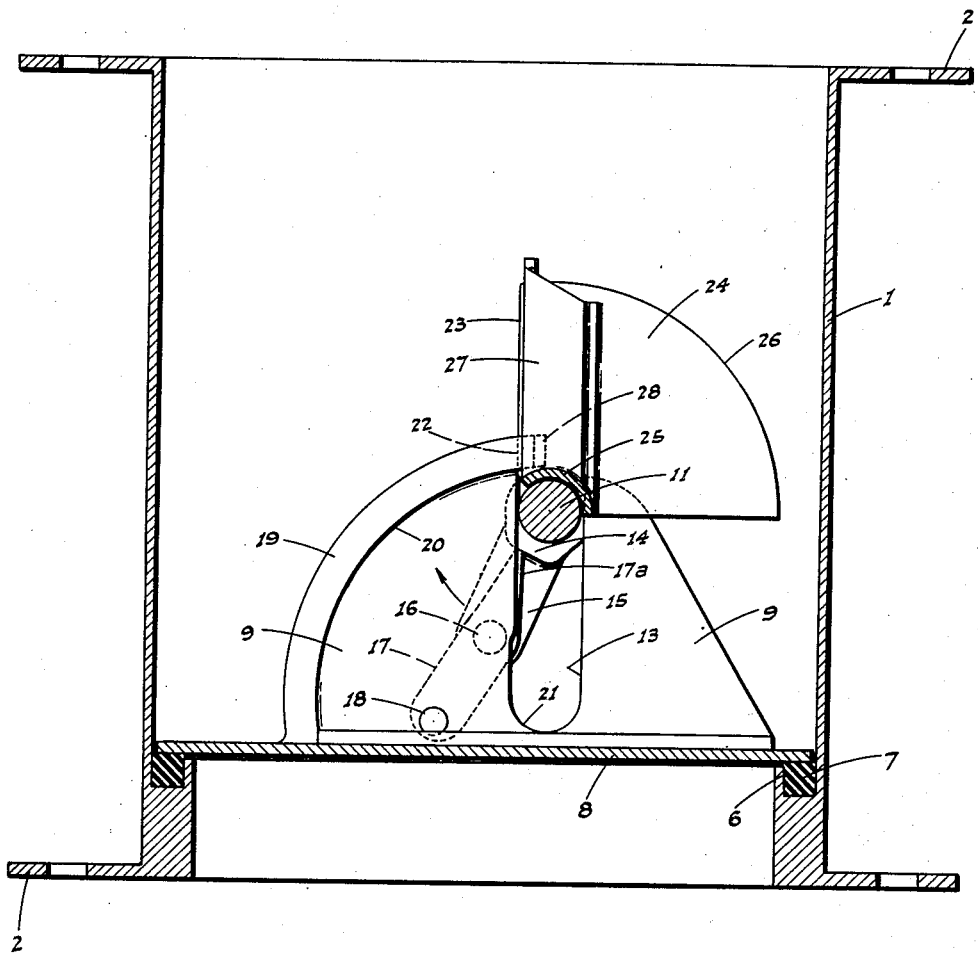
Fig. 3 is a sectional elevation of the valve on line 3—3 of Fig. 2.

The plates 9 and 10 are formed with shaft receiving slots 13 disposed at right angles to the disc and straddling the shaft; the latter being at the outer end of the slots when the valve disc 8 is seated, as shown in Fig. 3.

Secured on shaft 11, between the plates 9 and 10, is a hub 14 from which an arm 15 projects toward the valve disc, being pivoted at its outer end, as at 16, to the adjacent end of a link 17; the other end of which is pivoted to plate 9 near disc 8, as at 18. When the valve disc is in a fully closed position, the pivot 16 is beyond a dead center position relative to pivot 18 and shaft 11; the arm and link being then at an acute angle to the valve disc and pivot 18 being offset from the center of the disc and body on that side of the center opposite the offset of the shaft relative thereto, as shown in Fig. 3.

Movement of said arm and link beyond a dead center position is prevented by engagement of the end 17a of the link beyond pivot 16 with the edge of hub 14, as shown in Fig. 3.

The plate 9 is formed along its upstanding edge beyond the pivot 18 with a flange 19 projecting from the side of plate 9 opposite link 17 and whose inner edge 20 is curved concentric with the axis of the curved end 21 of the bottom of the adjacent slot 13.

The edge 22 of flange 19, which terminates at slot 13, is adapted to bear against the straight edge 23 of a guide plate 24 immovably secured on the body by means of a supporting strut 25 projecting inwardly from the adjacent side of the body in overhanging relation to the shaft 11.

The plate 24 is disposed laterally out from plate 9 so as to clear the same, the edge 23 extending lengthwise of body 1 or parallel to slot 13 when the valve disc is seated.

The opposite edge of plate 24 is curved concentric with shaft 11, as at 26, on a radius slightly less than that of curved edge 20 of plate 9.

Fixed on the strut 25 is a guide channel 27 facing plate 24 and parallel to edge 23 thereof; this channel receiving a lug 28 projecting from the outer adjacent end of flange 19. The side wall of the channel furthest from the edge 23 terminates short of or below the edge 26 of plate 24, as clearly shown in Figs. 3 and 5.

At one end, shaft 11 projects through a packing gland 29 in the adjacent bearing boss 12 (see Fig. 1) and is provided with a radial actuating arm or handle 30. A pawl and quadrant unit 31 of suitable type between the handle and boss 12 enables said handle—and the shaft—to be held against movement from any desired position.

Figure 4:
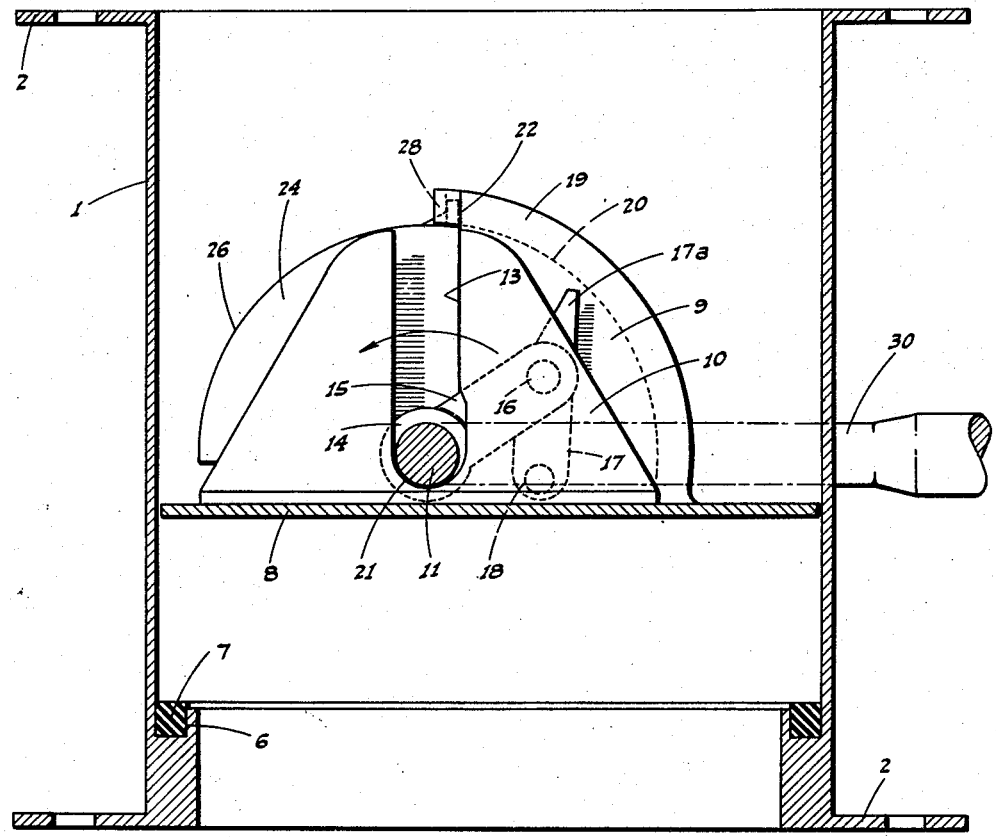
Fig. 4 is a sectional elevation of the valve on line 4—4 of Fig. 2, but showing the valve disc as lifted from its seat but still parallel thereto.

In operation, assuming the valve disc 8 to be closed against gasket 7, rotation of the shaft in a direction to break the over dead center relationship of arm 15 and link 17 swings arm 15 away from the valve seat, and the valve disc is moved away from said seat. Since the valve-mounted plate 9 is guided by engagement of edge 22 against edge 23 of the fixed guide plate 24 and engagement of lug 28 within the fixed guide channel 27, the valve disc will remain parallel to its closed position for the length of edge 23 and channel 27. The shaft 11 then seats in the curved end 21 of slots 13, lug 28 clears the channel 27, and the inner curved edge 20 of flange 19 becomes disposed in concentric alinement with curved edge 26 of plate 24, all as shown in Fig. 4.

Figure 5:
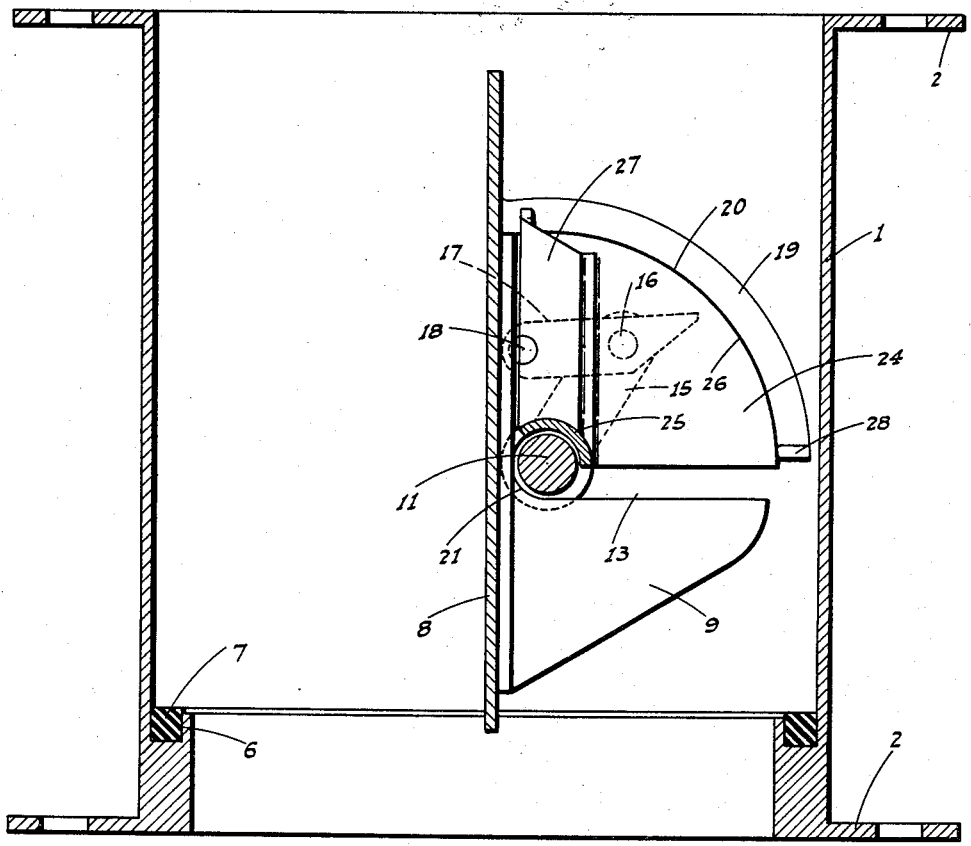
Fig. 5 is a similar view, showing the valve disc moved to its fully open position and looking to the same side of the valve as in Fig. 3.

The link 17 is then substantially at right angles to the valve disc, and further rotation of shaft 11 in the same direction then exerts a rotative action on the valve disc, due to the offset connection of the link 17 with said disc and relative to the shaft; the disc turning on the curved end 21 of the slots 13 as an axis. The flange 19 then overlaps and follows said curved edge 26, maintaining the valve disc guided throughout its rotative movement to a full open position, as shown in Fig. 5.

The valve disc may, of course, be halted in any position without possibility of the disc "flopping" or swinging about, by reason of the pawl and quadrant unit 31.

While the valve body and the valve are here shown and described as being circular in form, it will be obvious that said body and valve may be of rectangular or similar form without affecting the operation of the valve.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired:

1. A butterfly valve comprising a tubular body, a continuous valve seat in the body facing one end thereof, a valve disc engaging the seat when the valve is closed, a rotatable cross shaft journaled in the body between and spaced from the disc and said one end of the body, a radial arm on the shaft extending at an angle toward the valve disc when the valve is closed, a pivoted link connecting the arm and valve disc, and guide means between the body and disc arranged so that upon rotation of the shaft, in a certain direction and through a predetermined arc, the disc will first be raised from the seat a predetermined distance while remaining parallel thereto and will then be turned to assume a position lengthwise of the body; said guide means comprising transversely spaced plates on the disc projecting therefrom toward said one end of the body and having slots at right angles to the disc and straddling the shaft in slidable relation thereto, the shaft being adjacent the outer end of the slots when the valve is closed, a plate fixed with the body in adjacent but laterally offset relation to one of said first named plates and having an edge remote from the valve seat and curved concentric with the shaft to the side thereof opposite that from which the shaft-mounted arm projects when the valve is closed, a flange on and laterally offset from said one plate opposed to the fixed plate when the valve is closed and having its under edge curved on a radius substantially the same as that of said first named curved edge and disposed so as to engage over the same when the valve disc is moved to a valve-open position in which the shaft is adjacent the bottom of the slots, and additional guide elements between the valve disc and body to maintain said disc parallel to the valve seat while moving from a closed position to a position at which said curved edges are alined and in position to engage each other.

2. A structure as in claim 1, in which the additional guide elements comprise a guide channel fixed with the body in facing relation to said one plate and projecting lengthwise of the body toward said one end thereof, and a lug projecting from the outer end of the flange and slidably engaged in the channel and guided therein during initial valve seating movements, the channel terminating at its outer end at a point such that when the curved edges of said plate and flange are in engaging alinement, the lug is clear of the channel.

3. A structure as in claim 1, with a strut rigid with the body and extending substantially parallel with the shaft from one side of the body to adjacent the radial arm; said arm being disposed on the shaft substantially midway of the width of the body and the fixed plate being mounted on the strut adjacent its inner end.

References Cited in the file of this patent

FOREIGN PATENTS

| | | |
|---|---|---|
| 605,688 | France | 1926 |
| 903,215 | France | 1945 |
| 405,439 | Great Britain | 1934 |